(12) United States Patent  
Kulenkampff

(10) Patent No.: US 8,641,406 B2  
(45) Date of Patent: Feb. 4, 2014

(54) DEVICE AND PARTIAL MOLD FOR THE PRODUCTION OF ROTOR BLADES FOR WIND POWER PLANTS AND METHODS FOR THE PRODUCTION

(75) Inventor: Jens Kulenkampff, Kiel (DE)

(73) Assignee: Repower Systems SE, Hamburg (DE)

( * ) Notice: Subject to any disclaimer, the term of this patent is extended or adjusted under 35 U.S.C. 154(b) by 251 days.

(21) Appl. No.: 13/050,218

(22) Filed: Mar. 17, 2011

(65) Prior Publication Data

US 2011/0233819 A1  Sep. 29, 2011

(30) Foreign Application Priority Data

Mar. 25, 2010  (DE) .......................... 10 2010 003 296

(51) Int. Cl.
*B29C 33/38* (2006.01)

(52) U.S. Cl.
USPC ........... 425/340; 425/515; 425/235; 425/390; 425/504

(58) Field of Classification Search
USPC .............. 264/219; 425/235, 390, 504
See application file for complete search history.

(56) References Cited

U.S. PATENT DOCUMENTS

| 5,669,131 | A | 9/1997 | Gold |
| 7,473,385 | B2 * | 1/2009 | Stiesdal et al. ................ 264/314 |
| 2004/0099109 | A1 | 5/2004 | Dunlap et al. |

FOREIGN PATENT DOCUMENTS

| DE | 10 2008 038 620 | 12/2009 |
| DE | 10 2008 045 601 | 12/2009 |
| EP | 0465754 A2 | 1/1992 |
| EP | 1310351 A1 | 5/2003 |
| WO | 2009/139619 A1 | 11/2009 |

* cited by examiner

*Primary Examiner* — Yogendra Gupta
*Assistant Examiner* — Robert J Grun
(74) *Attorney, Agent, or Firm* — Rankin, Hill & Clark LLP

(57) ABSTRACT

A device for the production of rotor blades (1) for wind power plants with a multi-part manufacturing mold (20, 21, 22) for a rotor blade (1) that along a longitudinal extension, which extends from a rotor blade root (2) substantially to a rotor blade tip (3), has at least one area in which the rotor blade (1) has an aerodynamic airfoil section (4), which has an airfoil leading edge (5) and an airfoil trailing edge (6) that are connected via a suction side (8) and a pressure side (7) of the airfoil section (4), wherein at least two partial molds (21, 22; 34, 35) are provided for at least two shell parts (23, 24; 36, 37) of a rotor blade (1), of which a first shell part (23; 36, 37) and a second shell part (24; 36, 37) substantially lying flat on each other in the area of the airfoil trailing edge (6) are to be connected together. A corresponding partial mold (21, 22; 34, 35), and a method for the production of manufacturing molds (20) for rotor blades (1) and to the production of a rotor blade (1) are also disclosed.

8 Claims, 4 Drawing Sheets

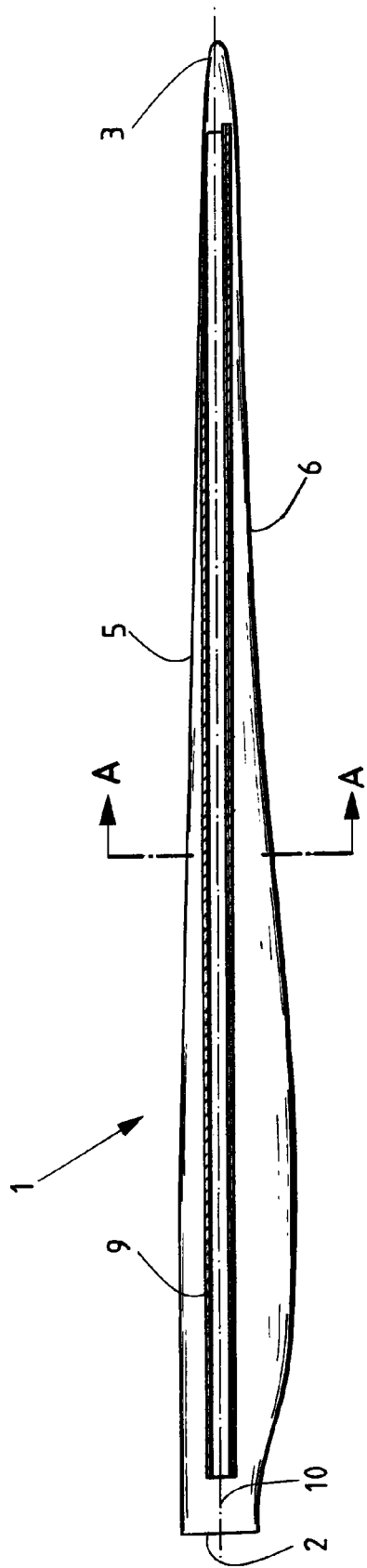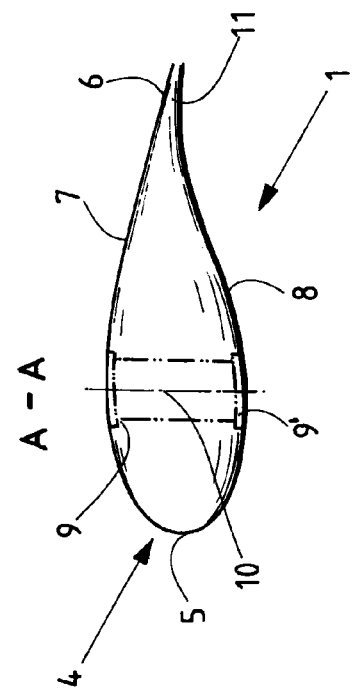

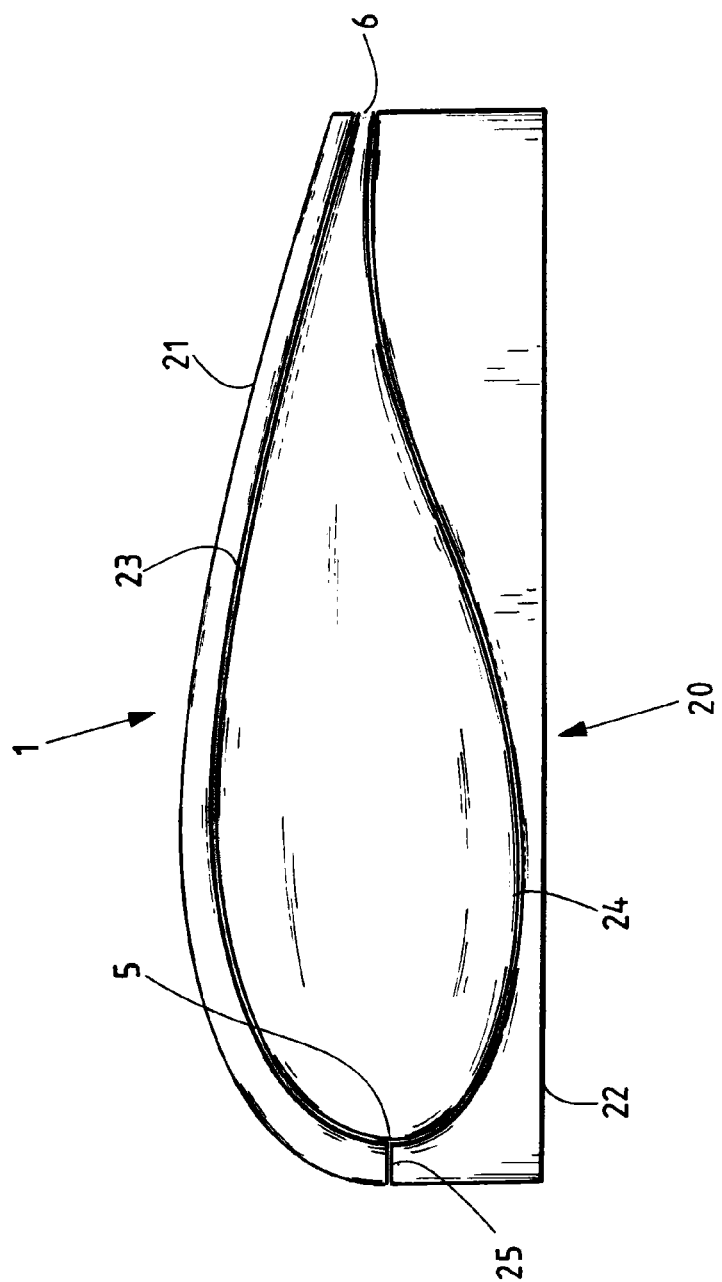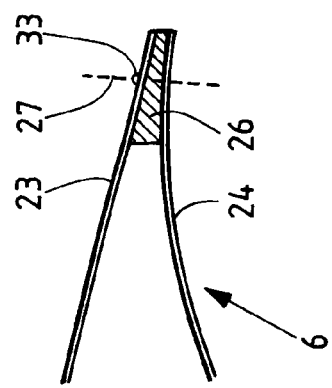

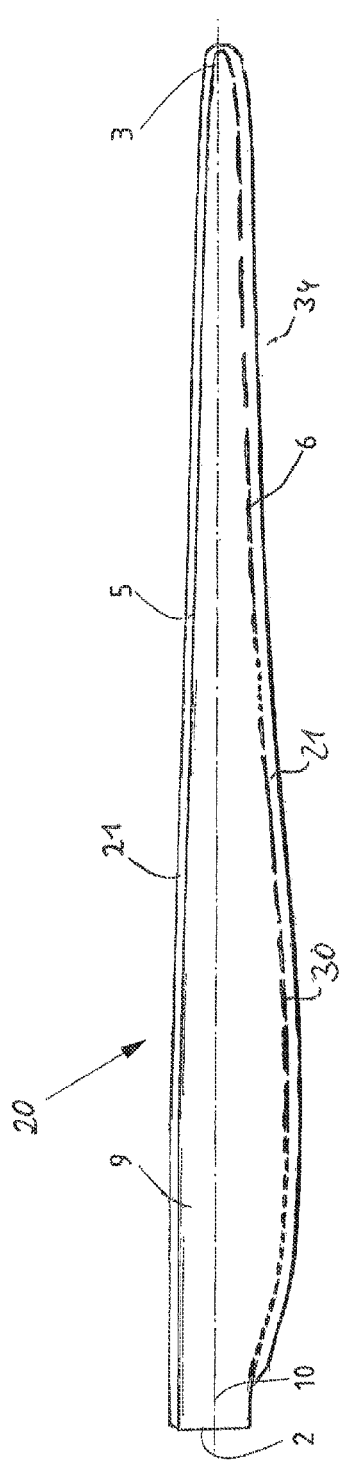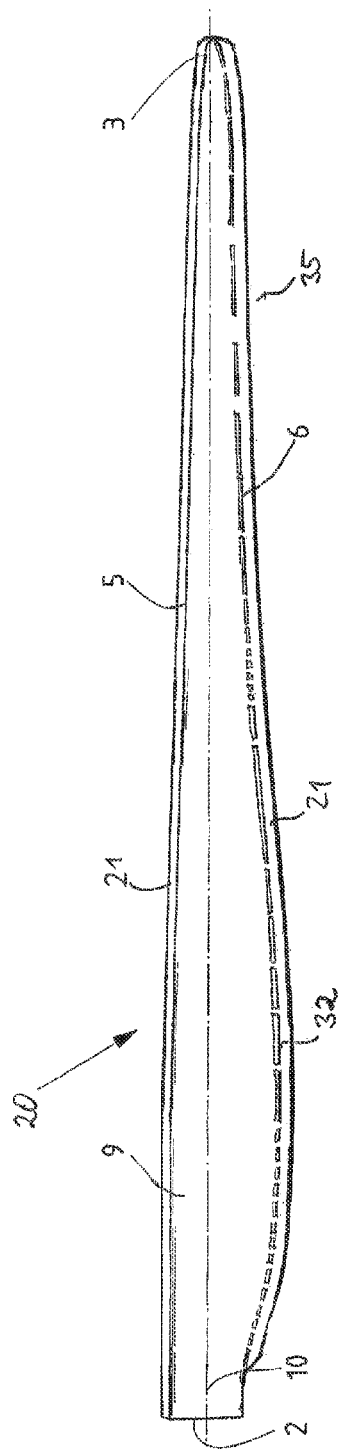

DEVICE AND PARTIAL MOLD FOR THE PRODUCTION OF ROTOR BLADES FOR WIND POWER PLANTS AND METHODS FOR THE PRODUCTION

BACKGROUND OF THE INVENTION

The invention relates to a device for the production of rotor blades for wind power plants with a multi-part manufacturing mold for a rotor blade that along a longitudinal extension, which extends from a rotor blade root substantially to a rotor blade tip, has at least one area in which the rotor blade has an aerodynamic airfoil section, which has an airfoil leading edge and an airfoil trailing edge that are connected via a suction side and a pressure side of the airfoil section, wherein at least two partial molds are provided for at least two shell parts of a rotor blade, of which a first shell part and a second shell part are to be connected together substantially lying flat on each other in the area of the airfoil trailing edge. The invention further relates to a corresponding partial mold, and methods for the production of manufacturing molds for rotor blades for wind power plants and for the production of a rotor blade.

Rotor blades for wind power plants are normally produced in a shell construction, wherein shell parts are produced in different molds or partial molds that after hardening in their partial molds are assembled and connected together. Shells of rotor blades are usually produced from fiber reinforced plastics, for example glass fiber reinforced polyester resins or epoxy resins that are placed into appropriate partial molds and are subsequently hardened.

In the frequently used case, where half shells are produced for a pressure side and for a suction side of the rotor blade and are joined together, the shell parts or half shells contact each other with their borders at the leading edge of the rotor blade. At the trailing edge of the rotor blade, the shell parts run substantially parallel and are placed on each other. The intermediate space between the shell parts at the trailing edge is filled with an adhesive, for example a resin, with which a fixed connection of the shell parts is produced at the trailing edge of the rotor blade.

For positioning the half shells relative to each other in their partial molds, at least one partial mold is formed slidable with respect to the other. When joining the shell parts together it is ensured that the positioning of the molds and the shell parts at the leading edge of the rotor blade leads to an exact connection. In order to compensate for inaccuracies in the shell molds and shell thicknesses, a certain play must be present at the trailing edge. For this purpose, the shell parts are not initially formed directly at the trailing edge, but rather extended over the actual end edges or trailing edges in order to acquire play area for the exact positioning of the leading edge.

In order to produce the end edge or trailing edge after the production of the rotor blade, the rotor blade is trimmed at the trailing edge, that is, the part of the rotor blade and the shell parts that form the trailing edge, are cut off along a trim line which corresponds to the trailing edge. However, the determination of the exact trim line represents a technical challenge because with the typically spherically curved surfaces of the rotor blade it is difficult to precisely measure the position of the end edge. Appropriate devices are complicated, large and expensive.

BRIEF SUMMARY OF THE INVENTION

Based on this prior art, the object of the present invention is to create a possibility for cost-effective, precise and reproducible trimming with a plurality of rotor blades.

The object underlying the invention is solved by a device for the production of rotor blades for wind power plants having a multi-part manufacturing mold for a rotor blade that along a longitudinal extension, which extends from a rotor blade root substantially to a rotor blade tip, has at least one area in which the rotor blade has an aerodynamic airfoil section, which has an airfoil leading edge and an airfoil trailing edge that are connected via a suction side and a pressure side of the airfoil section, wherein at least two partial molds are provided for at least two shell parts of a rotor blade, of which a first shell part and a second shell part, in the area of the airfoil trailing edge, are to be connected together substantially lying flat on each other, that is further developed in that a partial mold in the area of the trailing edge has a marking mold extending in a longitudinal direction of the partial mold for generating a trimming marking on a shell part in the area of the trailing edge of the rotor blade.

The invention is based on the fundamental idea that a marking mold which denotes the course of the trimming edge or the end edge of the rotor blade is incorporated in the corresponding partial mold or will be incorporated. During the production of the corresponding shell part by insertion of the not yet hardened shell material, for example a glass fiber reinforced plastic, the shell material assumes a negative of the marking mold at the corresponding location. After removal of the shell material or the shell from the partial mold, the corresponding shell part or the rotor blade has a negative of the marking mold on its exterior which corresponds to the course of the trailing edge or end edge to be trimmed.

Because the marking mold is disposed in the partial mold that is used multiple times, the course of the trailing edge can be reproduced in a plurality of rotor blades that were produced using the corresponding partial mold. The creation of an appropriate marking mold in a partial mold needs to be performed only once, is less costly and can be very exact. A further advantage is that the material of the mold or partial mold is substantially more rigid than the material of the rotor blade shell so that the measurement that is necessary for installing the marking mold in the partial mold yields more precise and reproducible results than is possible with a measurement on the rotor blade itself.

The shell parts and the corresponding partial molds can be half shells, where one shell is provided for the suction side of the rotor blade and one shell is provided for the pressure side of the rotor blade. One of the two sides, or both sides, can, however, also be produced by several shell parts and corresponding partial molds.

The feature of the shell parts lying flat on each other in the area of the trailing edge implies, within the scope of the invention, that the shell parts of the suction side and the pressure side at the trailing edge extend in the direction of the trailing edge following an aerodynamic airfoil section. In doing so, they approach each other further towards the trailing edge where necessary. The intermediate space between the shell parts at the trailing edge is filled with an adhesive mass, for example a resin, which creates a material bonded, extensive connection between the shell parts located opposite each other at the trailing edge. The trimming occurs after the connection or adhesion of the shell parts.

Preferably the marking mold is formed in the partial mold as a longitudinally extending recessed channel, a longitudinally extending raised bead, or as a longitudinally extending edge. A longitudinally extending recessed channel creates a longitudinally extending raised bead in the corresponding shell part. A longitudinally extending raised bead in the partial mold creates a longitudinally extending recessed channel in the corresponding shell part. The bead is the negative of the channel. In cross-section, the channel or the bead has a rectangular, rounded, or polygonal shape, for example. The negatives of the marking mold in the material of the shell are complementary in form to the corresponding marking molds.

Alternatively to this, the marking mold is present also advantageously interrupted or in sections. In this case, according to the invention there is a sequence of recesses or elevations with rectangular, round or oblong perimeters.

The marking mold is advantageously disposed in a partial mold that is provided for a shell part that during the production of the rotor blade and/or during a trimming of the trailing edge of the rotor blade lies on top relative to the trailing edge. This arrangement simplifies the process of the trimming because the trimming marking lies easily visible on top. For this purpose, the marking mold can be disposed in a partial mold that is provided for a shell part that is fastened or fixed during the production of the rotor blade, or alternatively, in a partial mold that is provided for a shell part that can be slid during the production of the rotor blade. Both alternatives yield a clean trimming.

The object of the invention is also solved by a partial mold of a manufacturing mold for a rotor blade for a wind power plant that along a longitudinal extension, which extends from a rotor blade root substantially to a rotor blade tip, has at least one area in which the rotor blade has an aerodynamic airfoil section that has an airfoil leading edge and an airfoil trailing edge that are connected via a suction side and a pressure side of the airfoil section, wherein the partial mold is provided for a shell part of the rotor blade that comprises a trailing edged of the rotor blade which is further characterized in that the partial mold in the area of the trailing edge has a marking mold, extending in a longitudinal direction of the partial mold, for creating a trimming marking on the shell part in the area of the trailing edge of the rotor blade.

This inventive partial mold corresponds to the partial mold having the marking mold of the inventive device which was already described above.

Preferably, it is provided that the marking mold is formed as a longitudinally extending recessed channel or as a longitudinally extending raised bead.

The object of the invention is also solved by a method for the production of manufacturing molds for rotor blades for wind power plants, wherein a rotor blade along a longitudinal extension, which extends from a rotor blade root substantially to a rotor blade tip, has at least one area in which the rotor blade has an aerodynamic airfoil section, which has an airfoil leading edge and an airfoil trailing edge that are connected via a suction side and a pressure side of the airfoil section, that is further developed in that in the area of the trailing edge a marking mold extending in the longitudinal direction of the partial mold is applied in a partial mold for a shell part of the rotor blade that comprises the trailing edge of the rotor blade, for generating a trimming marking on the shell part in the area of the trailing edge of the rotor blade.

Therefore, the inventive method has as a result a device or a partial mold which according to the invention has a marking mold for generating a trimming marking in the area of the trailing edge of the rotor blade.

The object of the invention is further solved by a method for the production of a rotor blade for a wind power plant that along a longitudinal extension, which extends from a rotor blade root substantially to a rotor blade tip, has at least one area in which the rotor blade has an aerodynamic airfoil section, which has an airfoil leading edge and an airfoil trailing edge that are connected via a suction side and a pressure side of the airfoil section, wherein shell parts of the rotor blade are produced in a device comprising several partial molds, particularly as described above, which is further developed in that by means of a partial mold having a marking mold, extending in the longitudinal direction of the partial mold, a trimming marking is generated on a shell part comprising a trailing edge of the rotor blade, on the shell part in the area of the trailing edge, and after joining the shell parts to form the rotor blade, the trailing edge of the rotor blade is trimmed along the trimming marking. The inventively produced rotor blade therefore has a trimming marking in the area of the trailing edge that is reproducibly and inexpensively produced, and serves for the trimming of the trailing edge of the rotor blade.

The inventive method is preferably further developed in that the during trimming of the trailing edge of the rotor blade, the trimming marking remains with a cut off trimming border. The trimming occurs after the removal of the rotor blade from the mold and after the trailing edge parts of the shell parts were bonded together, so that a trailing edge of the rotor blade has been formed. The trimming marking is cut off with the trimming border or seam, and thus is not part of the aerodynamic airfoil of the rotor blade.

The features, technical effects, and advantages described for the individual subjects of the invention, i.e., the device, the partial mold, the method for the production of the manufacturing molds and the method for the production of a rotor blade, apply in the same manner also for the respective other inventive subjects.

BRIEF DESCRIPTION OF THE DRAWINGS

The invention is described below, without restricting the general idea of the invention, using exemplary embodiments with reference to the drawings, whereby we expressly refer to the drawings with regard to the disclosure of all details according to the invention that are not explained in greater detail in the text. The drawings show:

FIG. 1 a schematic representation of a top view of a rotor blade,

FIG. 2 a schematic representation of a section through a rotor blade according to FIG. 1, FIG. 3 a schematic representation of a section through an inventive device, FIG. 4 a schematic sectional representation, in detail, of a rotor blade having an inventive trimming marking, FIG. 5 a schematic sectional representation, in detail, of a rotor blade having an inventive partial mold, and FIG. 6 a schematic sectional representation in detail of a further inventive partial mold.

FIGS. 7 and 8 are plan views of FIG. 3.

DETAILED DESCRIPTION OF THE INVENTION

Figure 5:
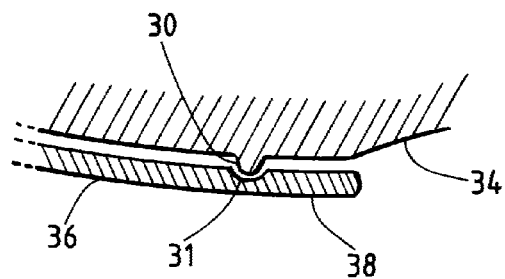

In the following figures, the same or similar types of elements or corresponding parts are provided with the same reference numbers so that a corresponding re-introduction can be omitted.

FIG. 1 shows a schematic representation of a top view of a rotor blade 1. The rotor blade 1 extends from a rotor blade root 2 to a rotor blade tip 3 and has a leading edge 5 and a trailing edge 6. The trailing edge 6 is usually created by trimming. A belt 9, also represented in FIG. 1, extends in the longitudinal extension of the rotor blade 1 and serves for the stabilization of the rotor blade 1. The belt 9 absorbs the forces and bending moments acting on the rotor blade 1, and further transmits these to the blade root 2 or respectively to the rotor hub. The belt 9 lies on a longitudinal sectional plane 10 which extends from the center of the rotor blade root 2 to the rotor blade tip 3.

In FIG. 2, the rotor blade 1 from FIG. 1 is shown schematically in a sectional representation along a cut line A-A from FIG. 1. The leading edge 5 and the trailing edge 6 are connected together via a pressure side 7 and a suction side 8, which create the airfoil section 4 of the rotor blade 1. FIG. 2 does not show that the airfoil section 4 is produced from a plurality of shell parts, for example two half shells for the pressure side 7 and the suction side 8. At the trailing edge 6, the shell parts of the pressure side 7 and the suction side 8 lie substantially flat on each other, and enclose a connection area 11 which for the connection of the shell parts and for the production of the trailing edge 6 is filled with an adhesive, for example, a resin.

Main belts 9, 9', which stabilize the rotor blade, are applied in the interior of the rotor blade 1 on the pressure side 7 and the suction side 8. FIG. 2 also shows the longitudinal sectional plane 10, which was already shown in FIG. 1. The plane runs transverse to a connection line or chord between the leading edge 5 and the trailing edge 6 of the rotor blade 1, and extends from the rotor blade root 2 to the rotor blade tip 3. Two webs, disposed between the main belts 9, 9', connect the suction side 8 to the pressure side 7.

FIG. 3 shows an inventive manufacturing mold 20 which comprises two partial molds, namely an upper partial mold 21 for a pressure side half shell 23 and a lower partial mold 22 for a suction side half shell 24. The lower partial mold 22 of the suction side of the rotor blade 1 is stationary, whereas the partial mold 21 for the pressure side of the rotor blade 1 is slidable, in order to be able to adjust a precise alignment of the two half shells 23, 24 at the leading edge 5 along the entire longitudinal extension of the rotor blade 1 during the production of the rotor blade 1 of the two half shells 23, 24.

For the compensation of the manufacturing inaccuracies of the half shells 23, 24, the upper slidable partial mold 21 can be slid by up to several centimeters with respect to the lower partial mold 22 for the suction side. The shape of the upper, slidable partial mold 21 and the half shell 23 of the pressure side embedded therein, do not change during the displacement, but the areas of the half shells 23, 24 opposite each other at the trailing edge 5 slide. FIG. 3 also shows that the partial molds 21, 22 abut at the leading edge 5 at an abutting edge or a contact point 25.

FIG. 4 shows a schematic representation of a detail of a rotor blade in cross-section. This is a part of the rotor blade 1 comprising the trailing edge 6. Half shells 23 for the pressure side and 24 for the suction side meet together at the trailing edge 6 in a planar manner. The end region is filled with an adhesive mass 26, for example a synthetic resin, which securely bonds the half shells 23, 24 together at the trailing edge 6.

The half shell 23 of the pressure side has, shortly before the end of the half shell 23, a bead shaped trimming marking 33, based on which a trimming edge 27, shown schematically with a dotted line, can be generated in a subsequent step of the method. The trimming edge 27 is visible on the produced rotor blade 1.

Figure 6:
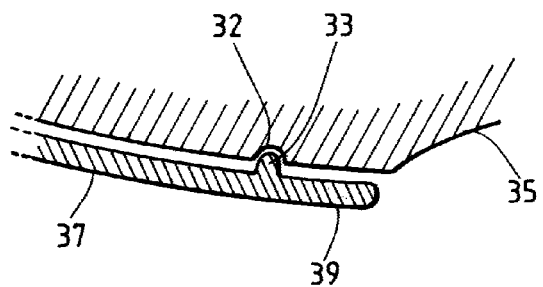

FIGS. 5 and 6 show two alternative partial molds 34, 35 in the area of the trailing edge of a rotor blade 1 schematically in cross section and FIGS. 7 and 8 show the alternative partial molds 34, 35 in plan view. The partial mold 34 in FIGS. 5 and 7 has a bead shaped marking mold 30 which creates a channel shaped trimming marking 31 on a shell part 36. By this channel shaped trimming marking 31, a trimming border 38 is designated which, together with the channel shaped trimming marking, is cut off in the course of trimming a rotor blade.

FIGS. 6 and 8 show the complementary alternative that a partial mold 35 has a channel shaped marking mold 32. Thus, the shell part 37 contains a bead shaped trimming marking 33 in the area of the trailing edge, with which a trimming border 39 is designated. In the course of the trimming, the trimming border 39 and also the trimming marking 33 are cut off.

All named features, including those taken from the drawings alone, and individual features, which are disclosed in combination with other features, are considered individually and in combination as essential to the invention. Embodiments according to the invention can be satisfied through individual characteristics or a combination of several characteristics.

LIST OF REFERENCE SYMBOLS

1 Rotor blade
2 Rotor blade root
3 Rotor blade tip
4 Airfoil section
5 Leading edge
6 Trailing edge
7 Pressure side
8 Suction side
9 Main belt pressure side
9' Main belt suction side
10 Longitudinal sectional plane
11 Connecting area trailing edge
20 Manufacturing mold
21 Partial mold pressure side
22 Partial mold suction side
23 Half shell pressure side
24 Half shell suction side
25 Contact point
26 Adhesive mass
27 Trimming edge
30 Bead shaped marking mold
31 Channel shaped trimming marking
32 Channel shaped marking mold
33 Bead shaped trimming marking
34, 35 Partial form
36, 37 Shell part
38, 39 Trimming border

The invention claimed is:

1. A device for the production of rotor blades (1) for wind power plants comprising:
   a multi-part manufacturing mold (20, 21, 22) for a rotor blade (1) that along a longitudinal extension, which extends from a rotor blade root (2) substantially to a rotor blade tip (3), has at least one area in which the rotor blade (1) has an aerodynamic airfoil section (4), which has an airfoil leading edge (5) and an airfoil trailing edge (6) that are connected via a suction side (8) and a pressure side (7) of the airfoil section (4),
   wherein the multi-part manufacturing mold includes at least two partial molds (21, 22; 34, 35) that are provided for at least two shell parts (23, 24; 36, 37) of a rotor blade (1), of which a first shell part (23; 36, 37) and a second shell part (24; 36, 37) lying substantially flat on each other in the area of the airfoil trailing edge (6) are to be connected together,
   wherein one of the partial molds (21, 22; 34, 35), in the area of the airfoil trailing edge (6), has a marking mold (30, 32) extending in a longitudinal direction of the partial mold (21, 22; 34, 35) for generating a trimming marking (31, 33) on a shell part (23, 24; 36, 37) in the area of the airfoil trailing edge (6) of the rotor blade (1), and wherein the marking mold is located inside the manufacturing mold at a location so as to contact an outermost layer of the shell parts.

2. The device according to claim 1, wherein the marking mold (30, 32), formed in one of the partial molds (21, 22; 34, 35), is a longitudinally extending recessed channel (32), is a longitudinally extending raised bead (30), or is a longitudinally extending edge.

3. The device according to claim 2, wherein the marking mold (30, 32) is non-continuous.

4. The device according to claim 1, wherein the marking mold (30, 32) is disposed in one of the partial molds (21, 22; 34, 35) that is provided for a shell part (23, 24; 36, 37), which during the production of the rotor blade (1) and/or during a trimming of the trailing edge (6) of the rotor blade (1) lies on top, relative to the airfoil trailing edge (6).

5. A partial mold (21, 22; 34, 35) of a multi-part manufacturing mold (20) for manufacturing a rotor blade (1) for a wind power plant, wherein along a longitudinal extension, which extends from a rotor blade root (2) substantially to a rotor blade tip (3), the rotor blade has at least one area in which the rotor blade (1) has an aerodynamic airfoil section (4), which has an airfoil leading edge (5) and an airfoil trailing edge (6) that are connected via a suction side (8) and a pressure side (7) of the airfoil section (4), wherein the partial mold (21, 22; 34, 35) is provided for a shell part (23, 24; 36, 37) of the rotor blade (1), which includes a trailing edge (6) of the rotor blade (1), wherein the partial mold (21, 22; 34, 35) comprises:

a marking mold in the area of the airfoil trailing edge (6), the marking mold (30, 32) extending in a longitudinal direction of the partial mold (21, 22; 34, 35) for generating a trimming marking (31, 33) on a shell part (23, 24; 36, 37) in the area of the airfoil trailing edge (6) of the rotor blade (1), wherein the marking mold is located inside the manufacturing mold at a location so as to contact an outermost layer of the shell part.

6. The partial mold (21, 22; 34, 35) according to claim 5, wherein the marking mold (30, 32) is formed as a longitudinally extending recessed channel (32) or as a longitudinally extending raised bead (30).

7. The device according to claim 2, wherein the marking mold (30, 32) is disposed in one of the partial molds (21, 22; 34, 35) that is provided for a shell part (23, 24; 36, 37), which during the production of the rotor blade (1) and/or during a trimming of the trailing edge (6) of the rotor blade (1) lies on top relative to the airfoil trailing edge (6).

8. The device according to claim 3, wherein the marking mold (30, 32) is disposed in one of the partial molds (21, 22; 34, 35) that is provided for a shell part (23, 24; 36, 37), which during the production of the rotor blade (1) and/or during a trimming of the trailing edge (6) of the rotor blade (1) lies on top relative to the airfoil trailing edge (6).

* * * * *